(12) United States Patent
Escamilla et al.

(10) Patent No.: US 11,460,896 B2
(45) Date of Patent: Oct. 4, 2022

(54) APPARATUS AND METHOD FOR SEALING AIR MOVERS IN AN INFORMATION HANDLING SYSTEM

(71) Applicant: DELL PRODUCTS, LP, Round Rock, TX (US)

(72) Inventors: Eduardo Escamilla, Round Rock, TX (US); Richard Mark Eiland, Austin, TX (US); Chris Everett Peterson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 702 days.

(21) Appl. No.: 16/509,914

(22) Filed: Jul. 12, 2019

(65) Prior Publication Data
US 2021/0011533 A1    Jan. 14, 2021

(51) Int. Cl.
  *G06F 1/20* (2006.01)
  *F16J 15/06* (2006.01)
  *G05B 15/02* (2006.01)

(52) U.S. Cl.
  CPC .............. *G06F 1/20* (2013.01); *F16J 15/064* (2013.01); *G05B 15/02* (2013.01); *G06F 1/203* (2013.01)

(58) Field of Classification Search
  CPC .......... G06F 1/20; G06F 1/203; F16J 15/064; G05B 15/02
  See application file for complete search history.

(56) References Cited

U.S. PATENT DOCUMENTS

| 6,501,647 | B1 | 12/2002 | Cepeda et al. |
| 2012/0026678 | A1* | 2/2012 | Rodriguez ................ G06F 1/20  361/679.48 |
| 2016/0103469 | A1 | 4/2016 | Kyle et al. |

\* cited by examiner

*Primary Examiner* — Jacob M Amick
*Assistant Examiner* — Charles J Brauch
(74) *Attorney, Agent, or Firm* — Larson Newman, LLP

(57) ABSTRACT

An information handling system includes a baseboard management controller (BMC) and a cooling module that receives a control signal from the BMC. The cooling module includes an air mover assembly, and a foam gasket that is disposed in between the air mover assembly and the bulkhead. A cam assembly has a cam lever holder that draws in a compression bracket to provide axial stress to the air mover assembly, a bulkhead, and the foam gasket.

20 Claims, 8 Drawing Sheets

APPARATUS AND METHOD FOR SEALING AIR MOVERS IN AN INFORMATION HANDLING SYSTEM

FIELD OF THE DISCLOSURE

This disclosure generally relates to information handling systems, and more particularly relates to sealing air mover assembly in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a baseboard management controller (BMC) and a cooling module that receives a control signal from the BMC. The cooling module may include an air mover assembly, and a foam gasket that is disposed in between the air mover assembly and the bulkhead. A cam assembly has a cam lever holder that draws in a compression bracket to provide axial stress to the air mover assembly, a bulkhead, and the foam gasket

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
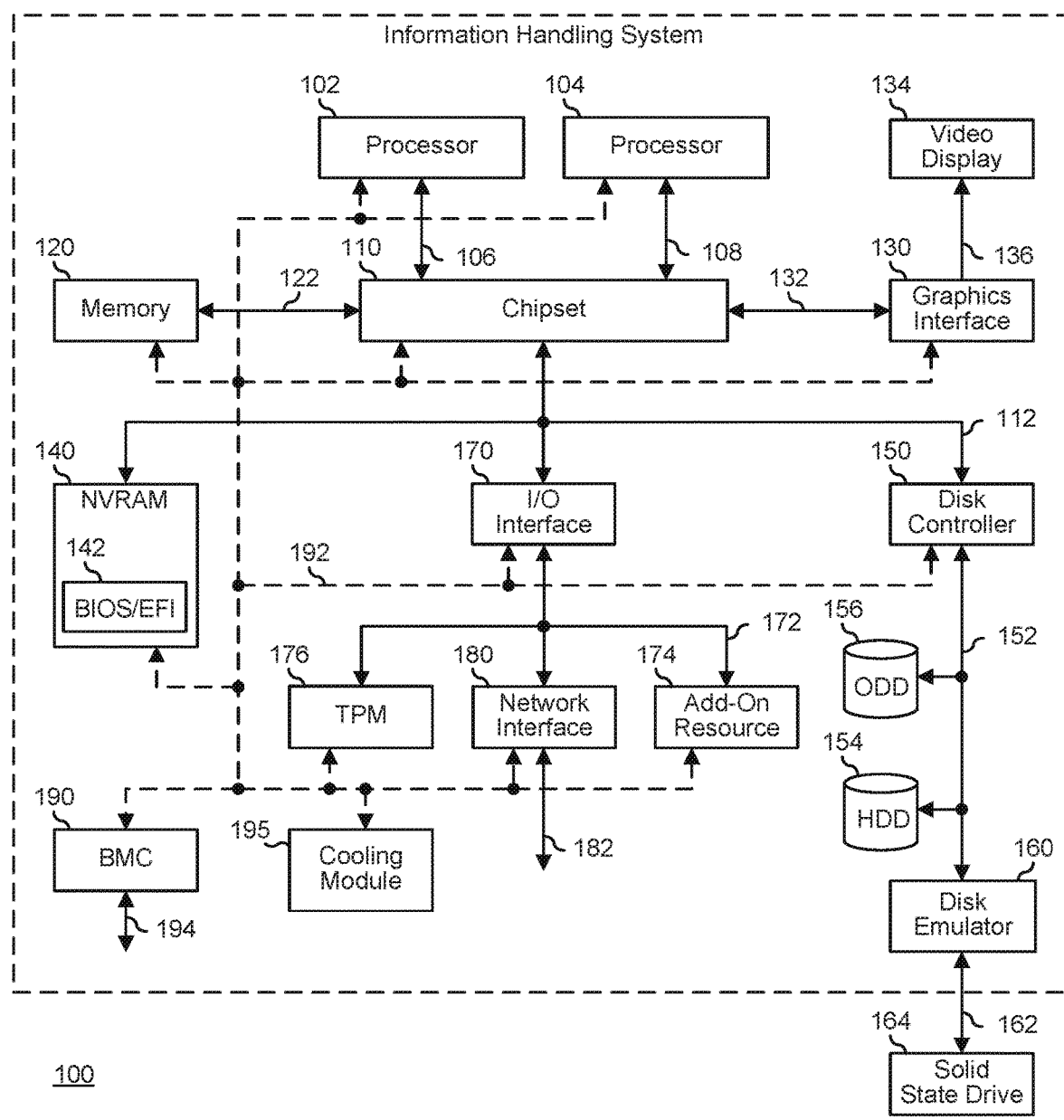
FIG. 1 is a block diagram of a generalized information handling system.

FIG. 1 illustrates an embodiment of an information handling system 100 including processors 102 and 104, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, a trusted platform module (TPM) 176, a network interface 180, a baseboard management controller (BMC) 190, and a cooling module 195. Processor 102 is connected to chipset 110 via processor interface 106, and processor 104 is connected to chipset 110 via processor interface 108.

Chipset 110 represents an integrated circuit or group of integrated circuits that manages data flow between processors 102 and 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 and 104 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a NIC, a sound/video processing card, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface device 180 includes a NIC or host bus adapter (HBA), and an example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processors 102 and 104, which provides various management functions for information handling system 100. In an embodiment, BMC 190 may be responsible for granting access to a remote management system that can establish control of the elements to implement power management, cooling management, storage management, and the like. The BMC 190 may also grant access to an external device. In this case, the BMC may include transceiver circuitry to establish wireless communications with the external device such as a mobile device. The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile telephone, a cellular telephone, a smartphone, a personal digital assistant, a multimedia playback device, a digital music player, a digital video player, a navigational device, a digital camera, and the like.

The term BMC may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by management interface 192 that may include an inter-integrated circuit (I2C) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

In an embodiment, the BMC 190 implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RACADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated into another element of the information handling system such as chipset 110, or another suitable element, as needed or desired. As such, BMC 190 can be part of an integrated circuit or a chip set within information handling system 100. BMC 190 may operate on a separate power plane from other resources in information handling system 100. Thus BMC 190 can communicate with the remote management system via network interface 194 or the BMC can communicate with the external mobile device using its own transceiver circuitry while the resources or elements of information handling system 100 are powered off or at least in low power mode. Here, information can be sent from the remote management system or external mobile device to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Cooling module 195 can be controlled by the remote management system through the BMC to circulate air to dissipate heat within the server. For example, the cooling module may receive control signals from the BMC in order to maintain a particular temperature limit. During the air circulation process, the mechanical components of the cooling module may require sealing in order to maximize the efficiency of the process.

Figure 2:
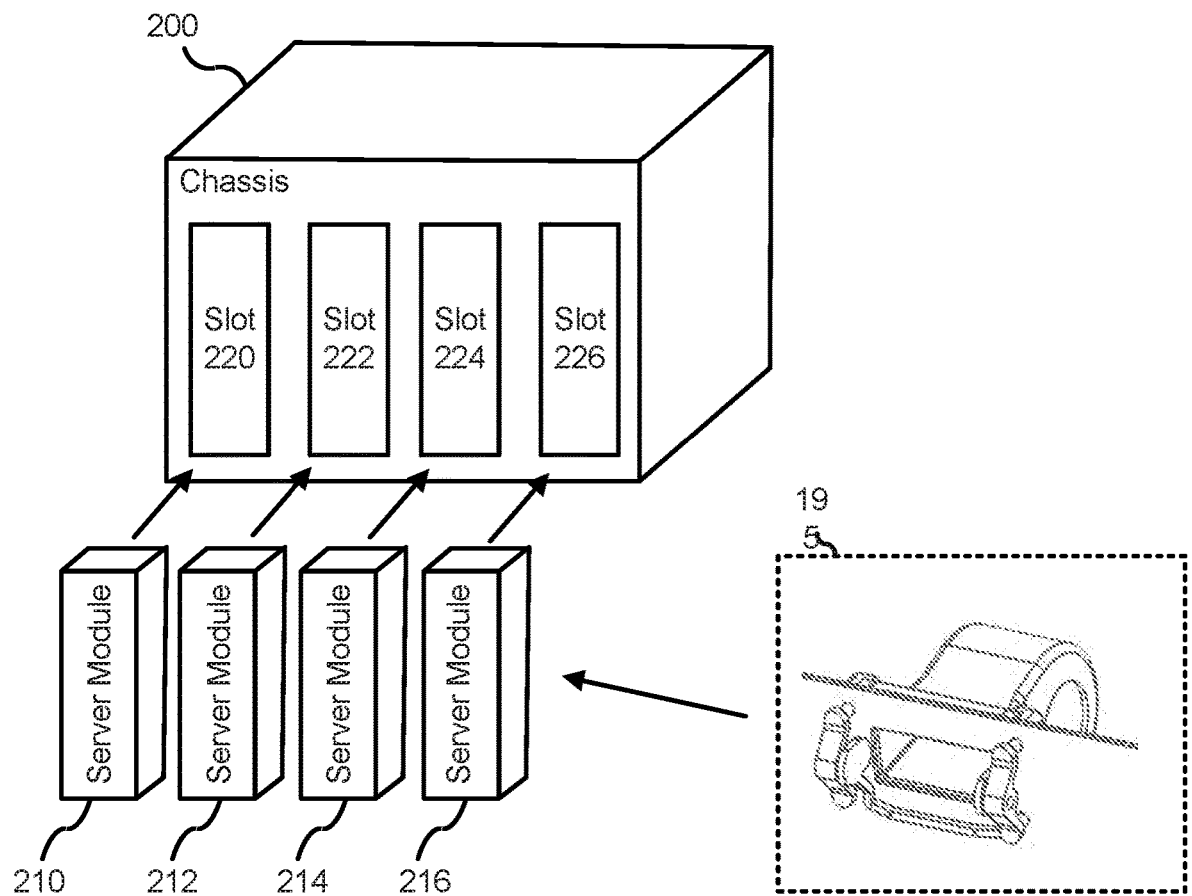
FIG. 2 is a perspective view of a chassis operable to receive server modules that each include a cooling module with a sealed air mover assembly, according to an embodiment of the present disclosure.

FIG. 2 shows a chassis 200 that may be installed in a server rack. The chassis 200 may include server modules 210-216 that can be installed in slots 220-226, respectively. Each of the server modules 210-216 may include the cooling module 195 that can be installed at a back panel of the server module. In other cases, the cooling module 195 can be installed at a bottom panel or on a side panel.

Figure 3:
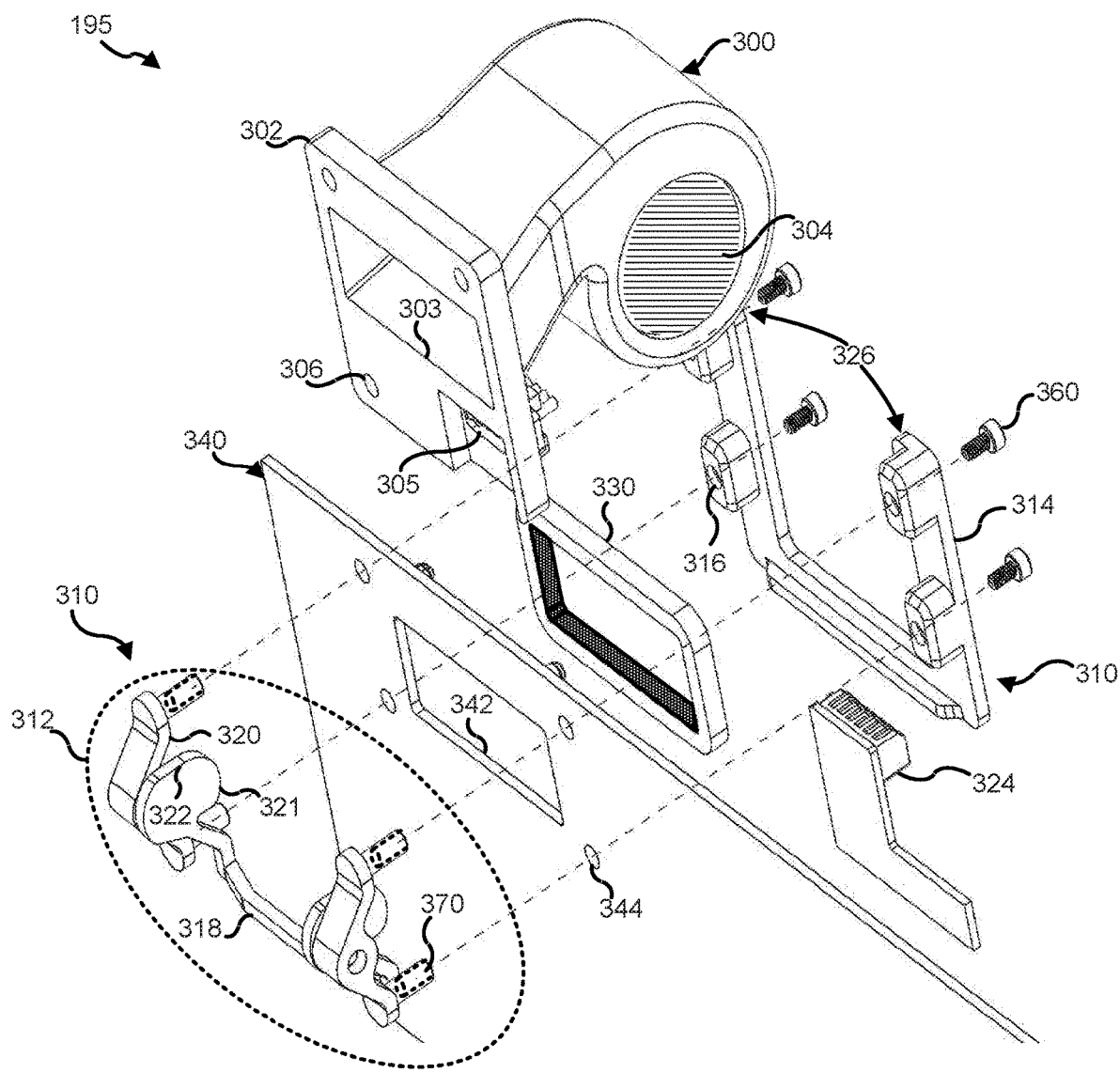
FIG. 3 is an exploded perspective view of the cooling module that can be installed in a bulkhead with a bulkhead opening, according to an embodiment of the present disclosure.

FIG. 3 shows the cooling module 195 that includes an air mover assembly 300 having a flange 302, an air port 303, a fan 304, a blade connector 305, and multiple flange holes 306. The cooling module 195 includes a QR cam assembly 310 that retains the air mover assembly 300 to a bulkhead 340. The QR cam assembly 310 includes a lever portion 312 that mates with a compression bracket 314 having holes 316.

The lever portion 312 includes a cam lever 318 that inserts and rotates within a cam lever holder 320. The lever portion 312 also includes at least one (1) cam 321 with a cam profile 322. The cooling module 195 also includes a mating electrical connector 324 and a foam gasket 330 that can be positioned along the bulkhead 340 having a bulkhead opening 342 and multiple bulkhead holes 344. Fasteners such as bolts 360 may be utilized to mate with corresponding tensioner rod holes 370 in order to couple the compression bracket 314 to the cam lever holder 320. The tensioner rod holes 370 may be threaded passages into which the bolts 360 insert and thread.

The flange 302, foam gasket 330, and the bulkhead 340 are disposed in between the compression bracket 314 and the cam lever holder 320 with the flange positioned at the side of the compression bracket 314 while the bulkhead 340 is positioned at the side of the cam lever holder 320. The QR cam assembly 310 is configured to quickly and easily remove and secure the air mover assembly 300 against the bulkhead 340 by using the compression bracket 314 to press the flange 302 against surface areas adjacent to the outer perimeter of the bulkhead opening 342.

By distributing the sealing foam gasket 330 under compression between the bulkhead opening 342 and the flange 302, the clamping or compressive force generated by the QR cam assembly 310 may reduce vibration when the fan 304 spins. The clamping or compressive force generate by the QR assembly 310 may also reduce air flow leakage between the flange 302 and the bulkhead 340. Perhaps more importantly, because the compression bracket 314 has a horseshoe or "U"-shape, an open end 326 of the compression bracket 314 may allow a user to release the QR cam assembly 310 and hot swap the air mover assembly 300 while still electrically powering the information handling system 100.

The compression bracket holes 316, flange holes 306, and the bulkhead holes 344 are in alignment in order for the bolts 360 to pass through and to be engaged with corresponding holes 370 of the tensioner rod 370. The bolts 360 are inserted at one surface of the compression bracket 314 with bolt heads providing axial stress towards the cam lever holder 320. The bolts 360 are positioned to threadably engage with corresponding tensioner rod holes 370 to generate the axial stress on the compression bracket 314. With the engaged bolts 360, the air port 303 and the bulkhead opening 342 are aligned to provide air passage to/from outside of the server module to the air mover assembly, or vice-versa.

To draw the compression bracket 314 towards the bulkhead 340, the QR assembly 310 may thus have at least two (2) positions. At first position, the cam 321 (having the cam profile 322 with one or more cam lobes) draws in the compression bracket 314 when the cam 321 is rotated and bears against the bulkhead 340. For example and when the user grasps the cam lever 318 and rotates it to the first position, the cam lever 318 also correspondingly rotates the cam 321. In this example, the cam 321 bears against the bulkhead 340 and the cam profile 322 facilitates generation of a compressive force that is perpendicular to axis of rotation of the cam 321. In this regard, the cam 321 with the cam profile 322 draws the compression bracket 314 and thus the air mover assembly 300 to the bulkhead 340. Movement of the cam lever 318, in other words, rotates the cam 321 to bear against the bulkhead 340, thus generating the compressive force along the bolts 360. However, when the user grasps the cam lever 318 and pulls it to a second position, the cam lever 318 also correspondingly rotates the cam 321 progressively out of contact with the bulkhead 340. The rotational movement of the cam 321 may thus release compressive forces along the bolts 360, thus moving or translating the compression bracket 314 and thus the air mover assembly 300 away from the bulkhead 340. Once the QR assembly 310 is released, the user may grasp and lift the air mover assembly 300 through the open end 326 of the compression bracket 314. Upward motion of the air mover assembly 300 also quickly and simply disengages the blade connector 305 from the electrical connector 324, thus severing or removing the electrical power. The cooling module 195 may thus be removed and replaced without powering down the information handling system 100.

The flange 302 is a portion on the air mover assembly 300 that facilitates physical communication between the air mover assembly 300 and the surface areas that are adjacent to outer perimeter of the bulkhead opening 342. This configuration allows the air port 303 to align and completely overlap with the bulkhead opening 342. The flange 302 may include the corner flange holes 306 that can fit dimensions of the bolts 360 that are inserted at one side the compression bracket 314 and engaged to female threads of the tensioner rod holes 370. When the engaged bolts 360 are pulled by the cam lever holder 320 through the corresponding tensioner rods holes 370, the compression bracket 314 produces a compressive stress that pushes the flange 302 against the bulkhead 340. As a consequence, the foam gasket 330 that is disposed in between is compressed against the bulkhead 340 in order to seal the spaces in between the bulkhead and the flange 302.

The air port 303 may include an aperture that allows passage of air to or from the server module. The air port 303 may serve or function as an inlet, thus allowing the fan 304 to draw fluid (e.g., ambient air) through the air port 303 and move, force, and/or exhaust the ambient air into the information handling system 100 for convective cooling effects. Alternatively, the fan 304 may intake or draw the ambient air and move, force, and/or exhaust the ambient air through the air port 303 and into the information handling system 100. The fan 304 may thus spin in any direction to intake/exhaust the ambient air, depending on the voltage, current, and/or polarity of the electrical power provided via the blade connector 305. The dimensions of the air port 303 may be based upon parameters of the air mover assembly 300. That is, a smaller sized air port 303 may facilitate smaller air flow into the air mover assembly while a larger sized air port 303 can provide higher dissipation of heat. The air port 303 may include the same shape and dimensions as that of the bulkhead opening 342. The bulkhead opening 342 includes a hole that facilitates the drawing of air from outside of the server module to the air mover assembly 300, or vice versa. When the compression bracket 314 engages back surfaces of the air mover flange 302 by generating axial stress towards the flange 302 and the sealing foam gasket 330, the air port 303 gets aligned with the bulkhead opening 342. For example, each of the air port 303 and the bulkhead opening 342 includes a square shape and an area of five square inches. In this example and when the flange 302 is pushed against the bulkhead 340, the bulkhead opening 342 gets aligned and positioned concentrically with the air port 303 to provide maximum air passage to the air mover assembly. This concentric alignment generates the complete overlapping between the bulkhead opening 342 and the air port 303.

The foam gasket 330 may include sealing gasket materials that can absorb vibrations from the operation of the air mover assembly. Different foam gasket materials may include different damping coefficients based on durometers or level of hardness of the foam gasket material. Materials with high damping coefficient may greatly absorb or reduce the vibration of the air mover assembly at certain frequencies. The damping coefficient can be balanced with amount of axial compression that is exerted by the flange 302 towards the bulkhead 340. For example, a Poron foam gasket includes microcellular urethane foam gasket with low compression set. In this example, the low compression set of the Poron foam gasket may require a particular amount of axial compression in order to reduce the vibration at a certain spinning frequency of the fan 304. The spinning frequency may also depend upon structure of the fan 304. In this case, the axial compression can be adjusted depending upon thickness of the Poron foam gasket used, structure and speed of the fan, or a combination thereof.

The foam gasket 330 may be disposed between the bulkhead opening 342 and the flange 302. The foam gasket 330 is placed along the surface areas where the flange 302 is in physical communication with the bulkhead 340. For example and upon clamping of the flange 302 against the bulkhead 340, the air port 303 and the bulkhead opening 342 may completely overlap one another. In this example, the foam gasket 330 is disposed along the areas adjacent to outer perimeter of the bulkhead opening 342. The foam gasket 330 may include an opening that has the same shape and size as those of the bulkhead opening 342 and the air port 303. In this manner, the foam gasket 330 may absorb vibrating pressures from the air circulation that may be generated by the operation of the air mover assembly 300. The air circulation is implemented by drawing the air within the module server. The air then passes through the bulkhead opening 342 and across the air port 303 before it goes out of the server module.

The QR cam assembly 310 facilitates physical communications between the flange 302 and the bulkhead 340. For example, the QR cam assembly 310 includes a configuration that draws the flange 302 towards the bulkhead 340 with the foam gasket 330 compressed in between as the sealing gasket. In this example, the foam gasket 330 biases the flange 302 against the surface areas that are adjacent to the bulkhead opening 342.

Figure 4:
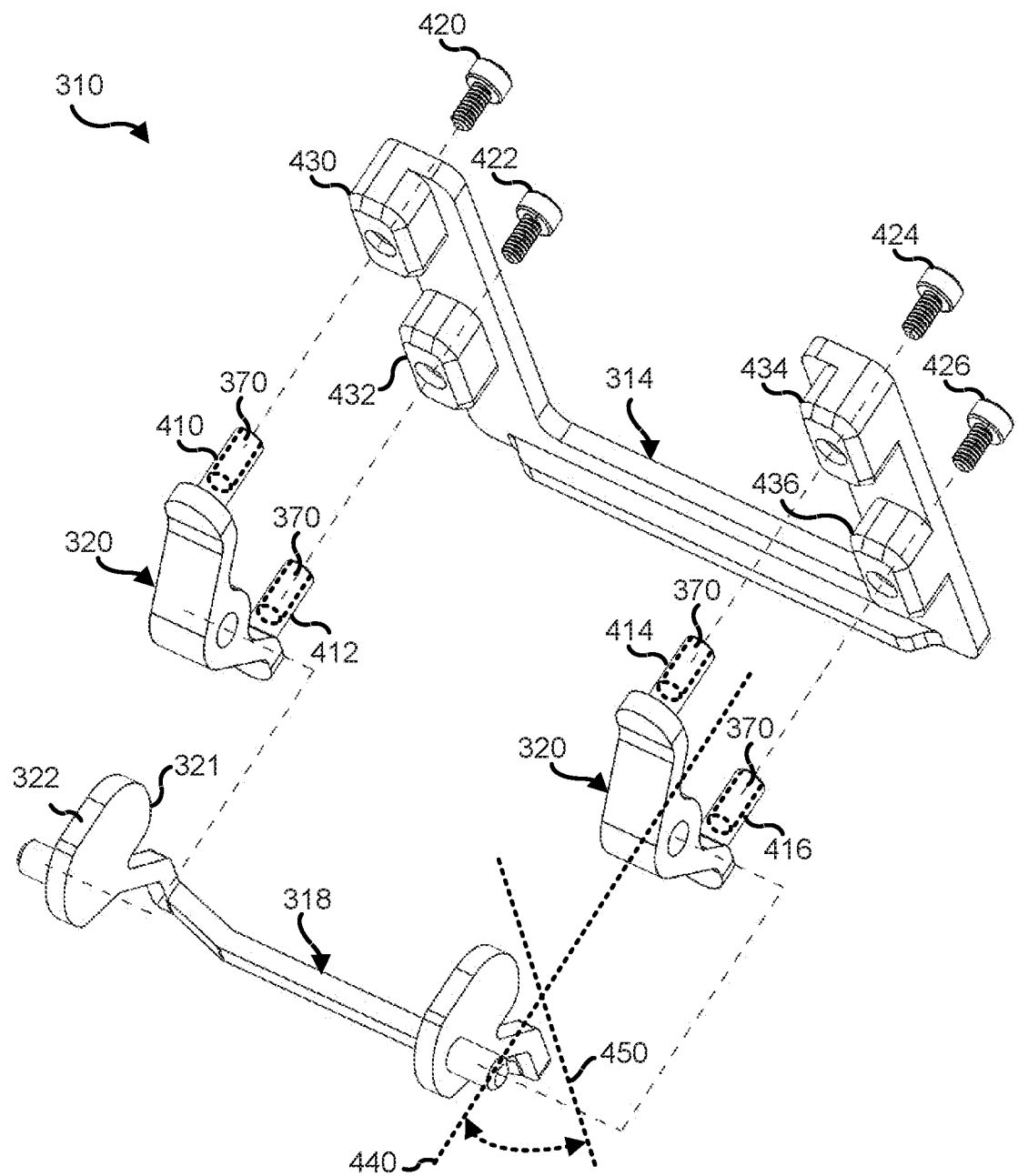
FIG. 4 is an exploded perspective view of a quick release (QR) cam assembly, according to an embodiment of the present disclosure.

FIG. 4 shows a structure of the QR cam assembly 310. The QR cam assembly 310 includes the compression bracket 314 that is pulled by the cam lever holder 320 through the use of the bolts. The cam lever holder 320 may include tensioner rods 410-416 that can receive bolts 420-426, respectively. Each of the tensioner rods 410-416 includes the tensioner rod hole similar to the tensioner rod hole 370 while the bolts 420-426 are similar to the bolts 360. The tensioner rods 410-416 are disposed to be in physical communications with alignment sockets 430-436, respectively, of the compression bracket 314. The bolt fasteners slide through unthreaded holes of the alignment sockets before they are engaged to the female threaded holes of the corresponding tensioner rod when the cam lever 318 is at the second position. In this case, the bolts may facilitate initial clamping and alignment between the cam lever holder 320 and the compression bracket 314. For example, the tensioner rod 410 is in physical communication with the alignment socket 430 over the bolt 420 that is engaged to the female threaded hole of the tensioner rod. In another example, the tensioner rod 412 is in physical communication with the alignment socket 432 when the bolt 422 is engaged to the female threaded hole of the tensioner rod, and so on. In these examples, the alignment sockets 430-436 of the compression bracket 314 may provide initial alignment between the air port 303 and the bulkhead opening 342.

The bolts 420-426 may pass through unthreaded holes of the flange 302. For example, the unthreaded hole 306 is formed on each corner of the flange 302 to generate a total of four holes. In this example, the bolt fastener may slide first to the unthreaded hole of the compression bracket alignment socket, then through the flange hole 306 of the flange 302, then to the bulkhead hole 344, and then received by the female threaded hole of the tensioner rod. In this embodiment, the bolts may facilitate the biasing between the flange 302 and the foam gasket 330, and the biasing between the foam gasket 330 and the bulkhead 340.

The locations of the flange holes 306 may be aligned with the locations of the compression bracket holes 316. Furthermore, the flange holes 306 are aligned with the tensioner rod female threaded holes 370. In this case, the flange holes 302, the corresponding compression bracket holes 316, and the corresponding tensioner female threaded holes 370 are positioned in alignment. For example, the flange 302 includes a total of four flange holes where the four flange holes form a square shape with a length of three inches on each side. That is, the square shape formed by the four flange holes includes an area of nine square inches. In this example, the four compression bracket holes may adapt this formed square shape including the three inches length so that each compression bracket hole can be aligned to corresponding flange hole. Similarly, the axial directions of the four tensioner rod female threaded holes 370 can adapt the formed square shape so that the tensioner female threaded rode holes may be aligned to corresponding compression bracket hole 318. With the aligned flange holes, compression bracket holes, and tensioner rod holes, the bolts 420-426 may push the compression bracket 314 towards the direction of the cam lever holder 320 when the bolts are initially screwed to the corresponding tensioner rod female threaded holes.

With the cam lever 318 pivoted to the second position, the compression bracket 314 and the cam lever holder 320 are aligned and positioned to lightly clamp the flange 302, foam gasket 330, and the bulkhead 340 that are disposed in between. However, when the cam lever is pivoted to the first position, the compression bracket 314 generates more amount of axial force when the cam 321 with the cam profile 322 draws in the compression bracket through the bolts 420-426. Depending upon the depth to which the bolts were initially engaged to the tensioner rod female threaded holes 370, the first position may provide a higher amount of axial stress that can be applied by the compression bracket 314 towards the flange 302, foam gasket 330, and the bulkhead 340. For example, the bolts 420-426 are initially screwed to corresponding female threaded holes 370 of the tensioner rods 410-416. The depth to which the bolts are engaged into the tensioner rod holes may determine the amount of clamping force that is applied by the compression bracket 314 when the cam lever arm is pivoted to the first position.

In an embodiment, the cam lever is positioned at the second position when the cam lever is pivoted to align with horizontal axis 440 of the cam lever holder 320. In this second position, the cam lever holder 320 lightly draws the compression bracket 314 towards the bulkhead 340. However and when the user grasps and pivots the cam lever 318 downward to about 90 degrees over vertical axis 450 of the cam lever holder 320, the cam lever holder shifts to the first position and draws in the compression bracket 314 through a higher axial force exerted on the compression bracket. The axial direction of the compression bracket 314 towards the mating cam lever holder 320 may clamp the flange 302, sealing foam gasket 330, and the bulkhead 340 that are positioned in between. This clamping further connects the electrical connector 324 to the blade connector 305.

Figure 5:
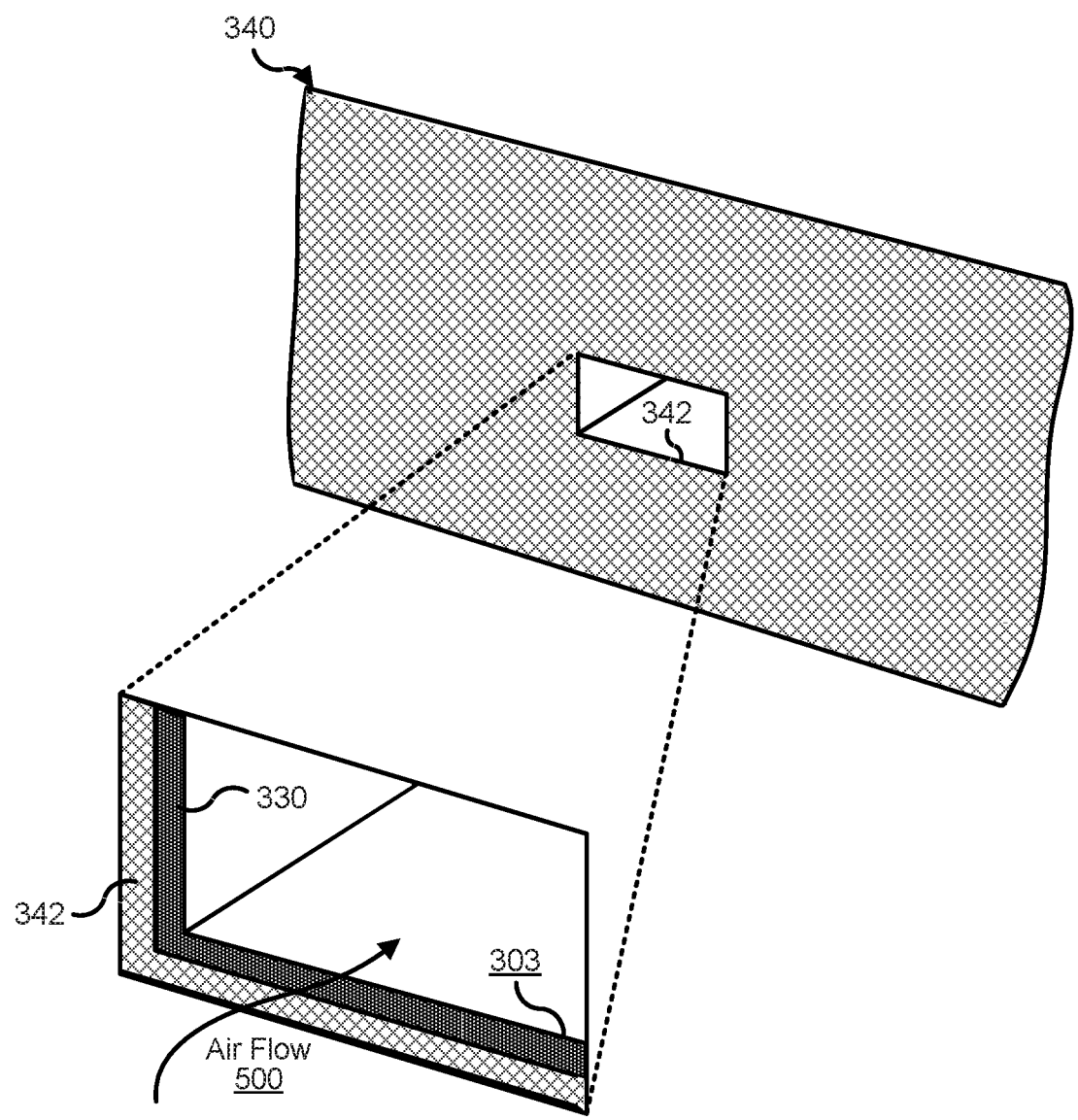
FIG. 5 is a perspective view of a bulkhead with a magnified bulkhead opening, according to an embodiment of the present disclosure.

FIG. 5 shows the bulkhead 340 and a magnified bulkhead opening 342 with a complete overlapping between the bulkhead opening and the air port 303. For ease of illustration, the QR cam assembly 310 that retains the air mover assembly 300 to the bulkhead 340 is not shown. When the cam lever 318 is pivoted to the first position, the bulkhead opening 342 and the air port 303 are aligned and positioned concentrically with one another so that air flow 500 that may be drawn within the server module. At the first position, the sealing foam gasket 330 biases the flange 302 against the bulkhead 340. For example, the foam gasket 330 is distributed along the areas where the flange 302 is in physical communication with the bulkhead 340. In this example, the foam gasket 330 is disposed along the surface areas that are adjacent to outer perimeter of the bulkhead opening 342. In this case, the sealing foam gasket 330 provides reduction in the vibration of the spinning fan and further prevents air re-circulation that may result to high power usage.

Figure 6:
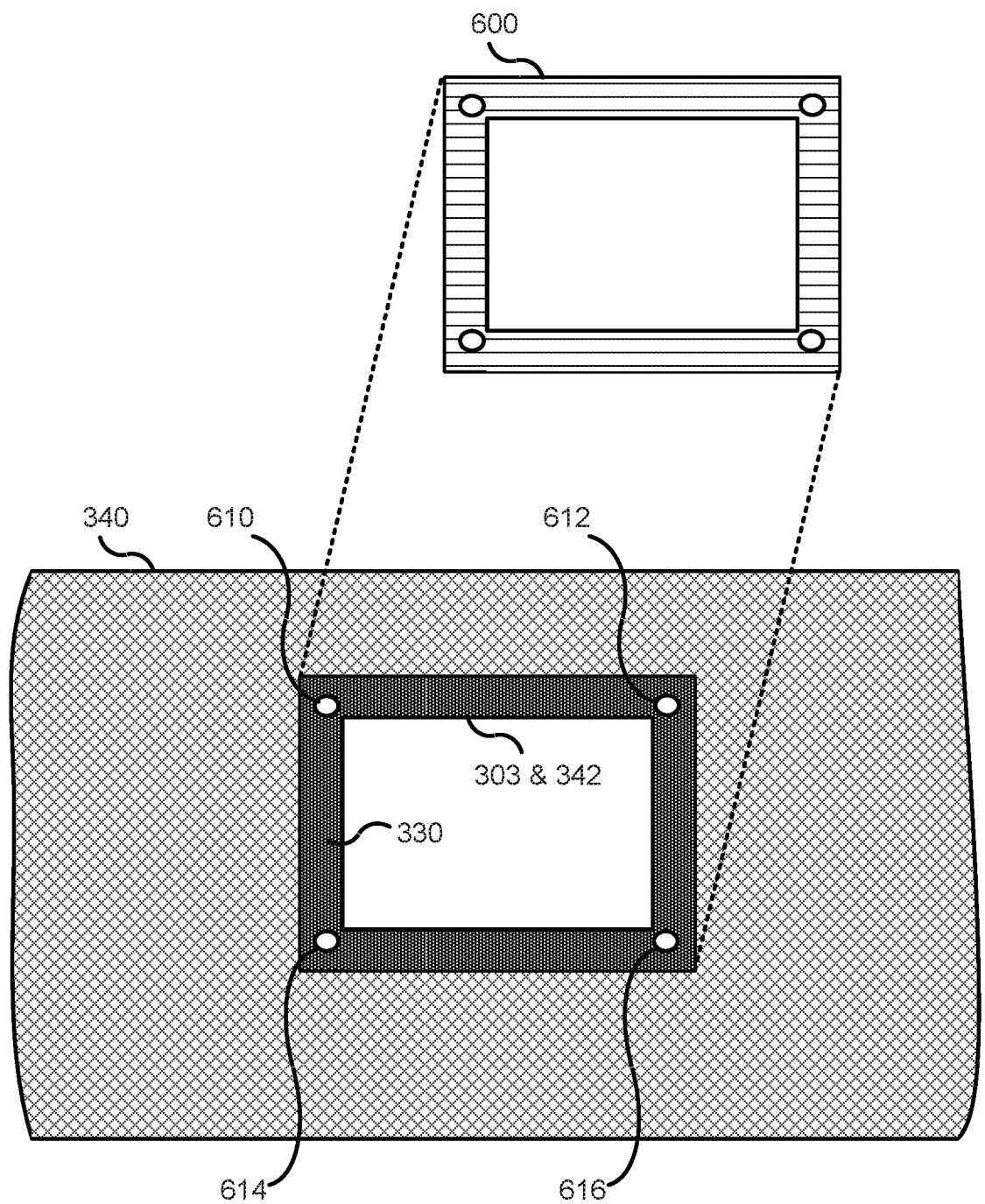
FIG. 6 is a view of a portion of the bulkhead including a distribution area for a sealing foam gasket, according to an embodiment of the present disclosure.

FIG. 6 shows the bulkhead 340 with the sealing foam gasket 330 that is distributed along outer surfaces of the bulkhead opening 342. For ease of illustration, the air mover assembly 300 and particularly, the air mover flange 302 that compresses the foam gasket 330 against the bulkhead 340 is not shown. When the cam lever 318 is pivoted to the first position, the bulkhead opening 342 completely overlaps the air port 303. In this first position, the foam gasket 330 is distributed over surface areas 600 that include an area where the flange 302 is in physical communication with the bulkhead 340. The surface areas 600 may include outer surface areas or portions that are adjacent to the perimeter of the bulkhead opening 342. For example, the area of the flange 302 that is in physical communication with the bulkhead is two square inches. In this example, the foam gasket 330 may be distributed into the two square inches area except on holes 610-616 that are operable to receive corresponding bolts from the compression bracket 314. Each of the holes 610-616 is aligned to respective flange hole 306 and the bulkhead hole 344. In this example still, the area of the opening that is formed by the foam gasket 330 may adapt the dimensions of the bulkhead opening 342 and the air port 303. That is, if each the bulkhead opening area and the air port area includes a square shape opening with an area of nine square inches, then the area of the foam opening may similarly form a square shape with an area of nine square inches as well.

Figure 7:
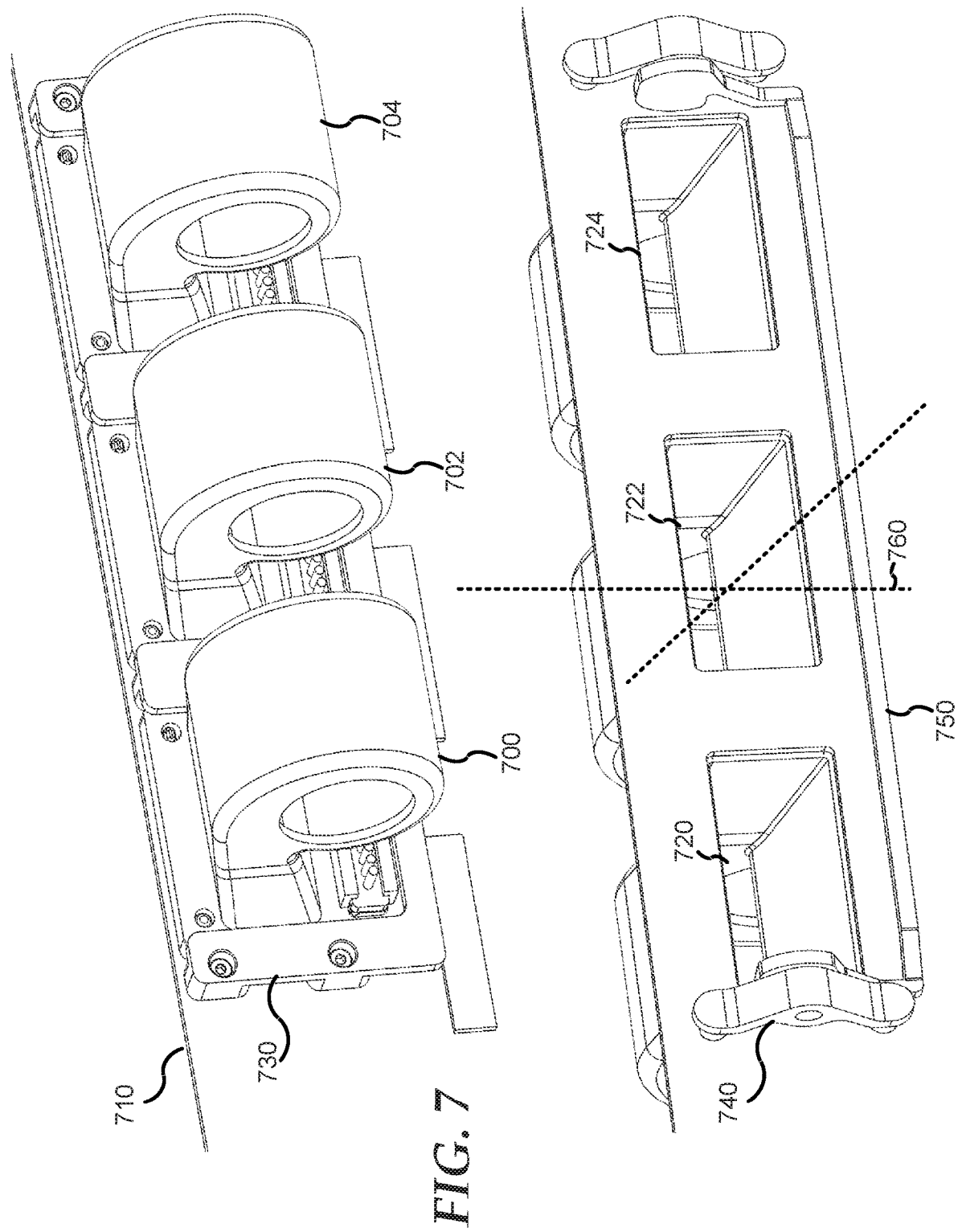
FIG. 7 is a perspective view of a the bulkhead that uses a single cam assembly to secure multiple air mover assemblies, according to an embodiment of the present disclosure.

FIG. 7 shows multiple air mover assemblies that are installed on the bulkhead through the use of a single cam assembly. In an embodiment, two or more air mover assemblies such as air mover assemblies 700-704 may be installed on a panel 710 having panel openings 720-724. The panel 710 and the panel opening are the same as the bulkhead 340 and bulkhead opening 342, respectively. Each of the air mover assemblies may include an air port that is positioned to align with respective panel opening of the panel 710. Each of these panel openings is similar to the bulkhead opening 342. The multiple air mover assemblies are disposed adjacent to one another and are secured by a single cam assembly that includes a single compression bracket 730, a single cam lever holder 740, and a single cam lever 750 which are the same as the compression bracket 314, cam lever holder 320, and the cam lever 318, respectively.

At the first position, the cam lever 750 is pivoted downward to about 90 degrees such that the cam lever aligns with a vertical axis 760. In this regard, the single cam lever holder 740 draws in the compression bracket 730 and generates axial stress on all flanges of the air mover assemblies 700-704. Each flange of the air mover assemblies 700-704 is biased by corresponding foams gaskets against the panel such that the sealing foam gasket may prevent vibration and air recirculation during temperature regulation operations in the information handling system. In an embodiment, each of the panel openings may completely overlap the air port of respective air mover assembly as described.

In other embodiment, the structure of each of the air mover assemblies 700-704 is modified so that one air mover assembly may be connected in series with another air mover assembly. This configuration may form an axial version of the air mover assemblies 700-704. In this other embodiment, the operation of the QR cam assembly 310 as described above may similarly apply.

Figure 8:
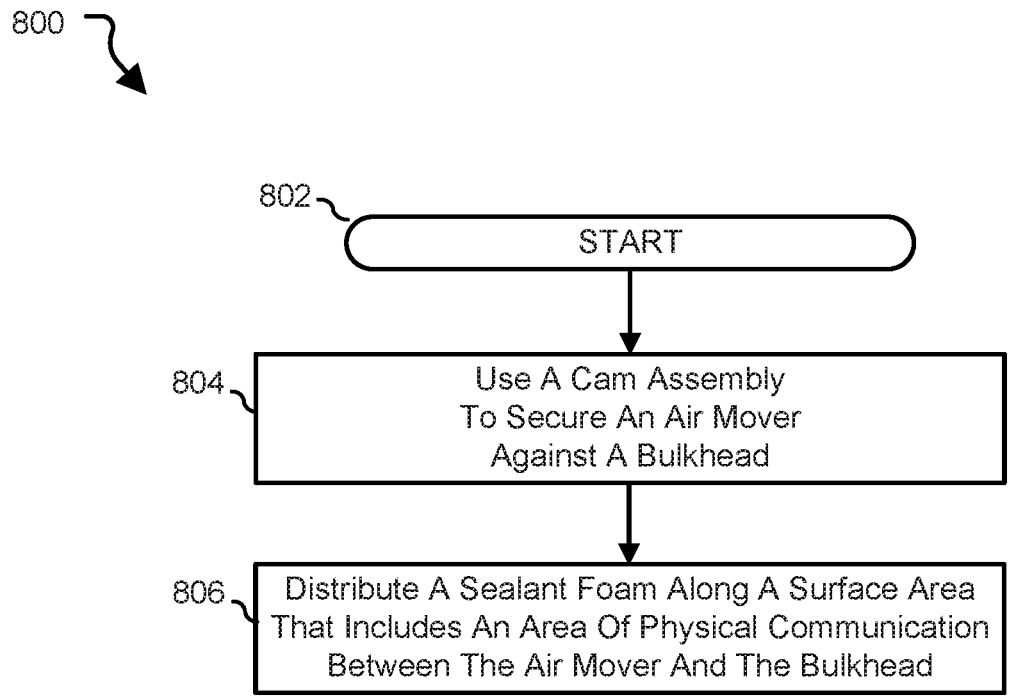
FIG. 8 is a flowchart showing a method for sealing air mover assemblies, according to an embodiment of the present disclosure.

FIG. 8 is a flowchart showing a method for sealing air mover assemblies, starting at block 802. At block 804, use a cam assembly to secure an air mover assembly against a bulkhead. The air port 303 of the air mover assembly 300 and the bulkhead opening 342 are aligned and positioned concentrically with one another when the air mover assembly is secured against the bulkhead 340. The cam assembly includes the cam lever 318 that facilitates serviceability of the air mover assembly. At block 804, distributing sealing foam gasket 330 on surface areas that include the area where the air mover flange 302 is in physical communication with the bulk head 340. In an embodiment, the thickness of the foam gasket 330 may depend upon amount of axial stress that is generated when the cam lever holder 320 pulls inward the compression bracket 314 towards the bulkhead 340. In this embodiment, the thickness of the foam gasket 330 and the amount of axial stress received by the foam gasket may be adjusted based on frequency vibration characteristics of the air mover assembly. For example, a thin foam gasket 330 may be distributed in between the flange and the bulkhead. In this example, the axial stress that can be introduced by the compression bracket should be balanced with frequency of vibration of the air mover assembly.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purposes of this disclosure, the information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Furthermore, the information handling system can include processing resources for executing machine-executable code, such as a central processing unit (CPU), a programmable logic array (PLA), an embedded device such as a System-on-a-Chip (SoC), or other control logic hardware. Information handling system can also include one or more computer-readable medium for storing machine-executable code, such as software or data. Additional components of information handling system can include one or more storage devices that can store machine-executable code, one or more communications ports for communicating with external devices, and various I/O devices, such as a keyboard, a mouse, and a video display. Information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system with an improved air mover vibration control, comprising:
   a baseboard management controller (BMC);
   a bulkhead; and
   a cooling module that receives a control signal from the BMC, the cooling module including:
     an air mover assembly;
     a foam gasket that is disposed in between the air mover assembly and the bulkhead; and
     a cam assembly including:
       a compression bracket that is in physical communication with the air mover assembly; and
       a cam lever holder that draws in the compression bracket to provide axial stress to the air mover assembly, bulkhead, and the foam gasket that are disposed in between the cam lever holder and the compression bracket.

2. The information handling system of claim 1, wherein the air mover assembly includes an air port that is positioned along a plane of an air mover flange.

3. The information handling system of claim 2, wherein the bulkhead includes a bulkhead opening that completely overlaps the air port.

4. The information handling system of claim 3, wherein the foam gasket is distributed along an area of the flange that is in physical communication with bulkhead, wherein the area includes an outer surface that is adjacent to the bulkhead opening.

5. The information handling system of claim 3, wherein the foam gasket forms an opening that is equal to dimensions of the air port and the bulkhead opening.

6. The information handling system of claim 1, wherein the foam gasket includes a Poron foam gasket.

7. The information handling system of claim 1, wherein the cam assembly includes a quick release cam lever that is pivoted to a first position or a second position.

8. The information handling system of claim 7, wherein the axial stress that is generated by the second position is lesser than the axial stress that is generated by the first position.

9. The information handling system of claim 7, wherein the first position includes pivoting the cam lever to align with a vertical axis of the cam lever holder, wherein the pivoted cam lever facilitates the drawing in of the compression bracket by the cam lever holder to clamp the air mover assembly, bulkhead, and the foam gasket.

10. The information handling system of claim 7, wherein a thickness of the foam gasket is adjusted based upon the axial stress at the first position.

11. A cooling module, comprising:
an air mover assembly including a flange;
a foam gasket that is disposed along an air port of the flange; and
a quick release (QR) cam assembly including:
a compression bracket that is in physical communication with the flange; and
a cam lever holder that draws in the compression bracket to provide axial stress to the flange and the foam gasket that are disposed in between the cam lever holder and the compression bracket.

12. The cooling module of claim 11, wherein the air port is positioned along a plane of the flange.

13. The cooling module of claim 12, wherein the foam gasket biases the flange against a bulkhead having a bulkhead opening that is positioned concentrically with the air port.

14. The cooling module of claim 13, wherein the foam gasket includes a Poron foam gasket that is distributed along an area of the flange that is in physical communication with bulkhead, wherein the area includes an outer surface that is adjacent to the bulkhead opening.

15. The cooling module of claim 13, wherein the foam gasket forms an opening that includes the same dimensions of the air port and the bulkhead opening.

16. The cooling module of claim 11, wherein the QR cam assembly includes a cam lever that is pivoted to a first position or a second position.

17. The cooling module of claim 16, wherein the first position includes pivoting the cam lever to align with a vertical axis of the cam lever holder, wherein the pivoted cam lever facilitates the drawing in of the compression bracket by the cam lever holder to clamp the air mover assembly, bulkhead, and the foam gasket.

18. The cooling module of claim 17, wherein the axial stress that is generated by the second position is lesser than the axial stress that is generated by the first position.

19. An information handling system, comprising:
a baseboard management controller (BMC);
a bulkhead having an opening; and
a cooling module communicating with the BMC, the cooling module comprising an electrically-powered fan controlled by the BMC, the cooling module having:
an air mover assembly including a flange and an air port that is positioned along a plane of the flange;
a foam gasket that is disposed between the air mover assembly and the bulkhead, wherein the foam gasket is distributed along an area of the flange that is in physical communication with an outer perimeter of the bulkhead opening; and
a cam assembly including:
a rotatable cam lever holder having a cam; and
a horseshoe-shaped compression bracket having an open end, the horseshoe-shaped compression bracket bolted by bolts through the flange and through the bulkhead to the rotatable cam lever holder;
wherein the cam assembly has a first position that rotates the cam into contact with the bulkhead and generates a compressive force in the bolts to draw the horseshoe-shaped compression bracket, the flange, and the rotatable cam lever holder to the bulkhead to compress the foam gasket; and
wherein the cam assembly has a second position that rotates the cam out of the contact with the bulkhead and releases the compressive force in the bolts to expand the horseshoe-shaped compression bracket, the flange, and the rotatable cam lever holder from the bulkhead to permit removal of the air mover assembly through the open end of the horseshoe-shaped compression bracket.

20. The information handling system of claim 19, wherein the distribution area for the foam gasket includes an outer surface that is adjacent to the bulkhead opening.

\* \* \* \* \*